US005537286A

United States Patent [19]

Gozlan et al.

[11] Patent Number: 5,537,286

[45] Date of Patent: Jul. 16, 1996

[54] METHOD OF PREPARING PLANAR PTC CIRCUIT PROTECTION DEVICES

[75] Inventors: Gilles R. Gozlan, Chaumont-en-Vexin, France; Shou-Mean Fang, Union City, Calif.

[73] Assignee: Raychem S.A., Cergy-Saint-Christophe, France

[21] Appl. No.: 170,241

[22] PCT Filed: Jun. 26, 1992

[86] PCT No.: PCT/GB92/01162

§ 371 Date: Dec. 23, 1993

§ 102(e) Date: Dec. 23, 1993

[87] PCT Pub. No.: WO93/00688

PCT Pub. Date: Jan. 7, 1993

[30] Foreign Application Priority Data

Jun. 27, 1991 [GB] United Kingdom .................... 9113888

[51] Int. Cl.$^6$ .................... H02H 5/04

[52] U.S. Cl. .................... 361/106; 338/21; 338/277; 29/612

[58] Field of Search .................... 29/411, 612, 621; 338/22 R, 228, 276, 277, 21; 219/504, 505; 361/103, 106

[56] References Cited

U.S. PATENT DOCUMENTS

| | | | |
|---|---|---|---|
| 2,978,665 | 4/1961 | Vernet et al. | 338/223 |
| 3,243,753 | 3/1966 | Kohler | 338/31 |
| 3,351,882 | 11/1967 | Kohler et al. | 338/322 |
| 4,017,715 | 4/1977 | Whitney et al. | 219/553 |
| 4,177,376 | 12/1979 | Horsma et al. | 219/553 |
| 4,200,970 | 5/1980 | Schonberger | 29/593 |
| 4,237,441 | 12/1980 | van Konynenburg et al. | 338/22 R |
| 4,238,812 | 12/1980 | Middleman et al. | 361/106 |
| 4,246,468 | 1/1981 | Horsma | 219/553 |
| 4,255,698 | 3/1981 | Simon | 320/35 |
| 4,272,471 | 6/1981 | Walker | 264/104 |
| 4,327,351 | 4/1982 | Walker | 338/22 R |
| 4,329,726 | 5/1982 | Middleman et al. | 361/58 |
| 4,445,026 | 4/1984 | Walker | 219/553 |
| 4,628,187 | 12/1986 | Sekiguchi et al. | 219/505 |
| 5,190,697 | 3/1993 | Ohkita | 252/511 |
| 5,212,466 | 5/1993 | Yamada et al. | 338/22 R |

FOREIGN PATENT DOCUMENTS

| | | | |
|---|---|---|---|
| 0131165 | 1/1985 | European Pat. Off. | H01C 7/04 |
| 0172302 | 2/1986 | European Pat. Off. | H05B 3/16 |
| 0087884 | 5/1986 | European Pat. Off. | H01C 7/02 |
| 0435574 | 7/1991 | European Pat. Off. | H01C 7/02 |
| 1452971 | 9/1966 | France . | |
| 1-259502 | 1/1989 | Japan | H01C 7/02 |
| 3-68104 | 3/1991 | Japan | H01C 7/02 |
| 1165837 | 10/1969 | United Kingdom | H01C 7/04 |
| 1534715 | 12/1978 | United Kingdom | H01R 13/66 |
| 2020900 | 11/1979 | United Kingdom | H01C 7/02 |
| 2038549 | 7/1980 | United Kingdom | H01L 23/02 |
| 2074337 | 10/1981 | United Kingdom | H01C 7/02 |
| 1601853 | 11/1981 | United Kingdom | H01C 17/22 |

OTHER PUBLICATIONS

International Search Report for PCT/GB92/01162, filed Jun. 26, 1992.

D. Wolfer, "Nicht nur zum Heizen", *Elektrotechnik,* vol. 61, No. 4, pp. 14–16, Feb. 23, 1979.

Search Report for British Patent Application No. 9113888.3, filed Jun. 27, 1991.

Littlewood and Briggs, "Investigations of Current Interruption by Metal–filled Epoxy Resin", *J. Phys. D; Appl. Phys.,* vol. 11, pp. 1457–1462 (1978).

R. F. Blaha, "The PTC Resistor", *Proceedings of the Electronic Components Conference,* 1971.

H. Shulman and John Bartko, "Solid State Bistable Power Switch Study", contract NAS–12–647, National Aeronautics and Space Administration, Aug. 1968.

*Primary Examiner*—Jeffrey A. Gaffin
*Assistant Examiner*—Michael Sherry
*Attorney, Agent, or Firm*—Marguerite E. Gerstner; Herbert G. Burkard

[57] ABSTRACT

A method of making a planar polymeric circuit protection device arranges for the current between two electrodes (4, 6) to flow parallel to the surface of a sheet (2) of conductive polymeric material, rather than through its thickness. The resistance and tripping current levels of the device can be finely controlled and set at comparatively low levels.

9 Claims, 2 Drawing Sheets

METHOD OF PREPARING PLANAR PTC CIRCUIT PROTECTION DEVICES

BACKGROUND OF THE INVENTION

1. Field of the Invention

The present invention relates to electrical devices, for example circuit protection devices, and to their methods of manufacture. In particular, the devices comprise material that has a positive temperature coefficient of resistance (PTC) and that undergoes a significant and sharp increase in resistance at a specified temperature or over a specified narrow temperature range above ambient temperature.

2. Introduction to the Invention

PTC materials, which may be polymeric or ceramic, are known for use in electrical devices such as heaters, and also for protecting electrical circuits against excessive current or temperature. The excessive temperature may itself arise simply from current flowing through the device, or may be due to an increase in the ambient temperature beyond a desired value. Details of developments relating to conductive polymer PTC compositions and devices comprising them, are given for example in U.S. Pat. Nos. 4,017,715, 4,177,376, 4,246,468, 4,237,441, 4,238,812, 4,329,726, 4,255,698, 4,272,471, 4,445,026, and 4,327,351, and GB 2,038,549. It has been proposed to use devices comprising PTC elements to protect circuits against fault conditions arising from excessive temperatures and/or circuit currents in for example U.S. Pat. Nos. 2,978,665, 3,243,753 and 3,351,882, U.K. Pat. No. 1,534,715, the article entitled "Investigations of Current Interruption by Metal-filled Epoxy Resin" by Littlewood and Briggs in J. Phys D: Appl. Phys, Vol. II, pages 1457–1462, and the article entitled "The PTC Resistor" by R. F. Blaha in Proceedings of the Electronic Components Conference, 1971, and the report entitled "Solid State Bistable Power Switch Study" by H. Shulman and John Bartko (August 1968) under Contract NAS-12-647, published by the National Aeronautics and Space Administration. U.S. Pat. Nos. 4,238,812 and 4,255,698 disclose practical circuit protection devices comprising conductive polymer PTC elements.

The disclosure of each of the patents and publications referred to above is incorporated herein by this reference.

The present invention is concerned particularly, though not exclusively, with electrical devices comprising PTC material, preferably polymeric, for use in circuit protection, and U.S. Pat. Nos. 4,238,812 and 4,329,726 referred to above for example, disclose such devices. PTC circuit protection devices are such that under normal operating conditions, determined by the current and temperature rating of the PTC material, they exhibit very low resistance to the flow of current therethrough. Under fault conditions, of excessive current and/or temperature, the PTC material heats up, significantly increases its resistance and thus switches off the flow of current therethrough, thereby protecting an associated electrical circuit. The higher the resistance of the material after passing through the switching transition, the lower is the residual current that can flow through the device, and thus the more effective is the device in protecting its circuit. Products embodying these principles are presently sold by Raychem Corporation under its tradename POLYSWITCH. Some of such products are formed from a substantially homogeneous sheet of polymeric PTC material. The sheet is coated over each of its major surfaces with electrically conductive material, to act as electrodes, and disc, rectangular, or other, shaped devices are stamped therefrom.

The resistivity of the PTC material of POLYSWITCH devices typically does not exceed 10 ohm-cm, and taking a typical value of 5 ohm-cm and a disc configuration with typical dimensions of diameter 2 cm and thickness 0.05 cm, the resistance at room temperature (i.e. about 20° C.) of the device is typically 0.08 ohm. Although other geometries, for example rectangular, can be employed, the resistance values provided by devices that are of a size that can conveniently be handled manually do not vary significantly from the values given above. If it is desired to make such devices of different resistance, then this can be arranged in various ways: (a) a different PTC material having a different resistivity can be employed. However, it has been found that polymeric materials in sheet form suitable for circuit protection devices and having a resistivity greater than about 10 ohm-cm cannot reproducibly be manufactured in significant volume. This makes it very difficult to produce devices having a significantly higher resistance. This is, of course, not necessarily true for polymeric PTC materials in general, but has been found to be so for materials needed for circuit protection devices in view of their need to have a relatively sharp transition from low resistance to high resistance as the temperature increases, for example due to a current increase above a threshold value; (b) the separation of the electrodes can be varied, but for sheet material it is difficult reproducibly to increase the thickness enough to produce a suitable device having a significantly higher resistance. The difficulty encountered is that of providing, by extrusion for example, a relatively thick sheet of a polymeric material that is highly loaded, for example by as much as 50% of its volume, with fillers such as carbon black, in which the composition of the material is homogeneous throughout. In this respect, it should be noted that a typical width of extruded sheet is 30 cm; and (c) the diameter (or other planar) dimension of the stamped product can be varied. However, below a certain size it becomes very difficult physically to handle the individual devices, so again there is a problem with producing devices of higher resistance. For these practical reasons therefore it is difficult to make such devices having a resistance greater than say about 5 ohms. However, there is a requirement for higher resistance devices in order to limit current in electrical or electronic circuits to less than about 200 mA at normal operating voltages. In this respect, it is to be noted that the power generated in the device ($I^2R$) must be large enough to raise the temperature of the PTC material up to the temperature at which its resistance increases sharply, so that the lower the current flowing through the device the higher must be its resistance.

Other POLYSWITCH products produced by Raychem are of strip rather than disc form, but with strip configuration, the short length of the strip needed for a sufficiently high resistance device to protect circuits adequately against currents below about 200 mA would be too small for easy handling.

EP-A-0 087 884 discloses a further polymeric PTC circuit protection device in which a cylindrical element of PTC material is mounted within an enclosure between cup-shaped electrodes at each end thereof.

SUMMARY OF THE INVENTION

We have discovered that convenient PTC circuit protection devices, particularly though not exclusively of polymeric material, can be made of higher resistance reproducibly using known sheet PTC material and applying conductive material (for formation of electrodes) at selected spaced apart locations on one side of the sheet. Current flow between the electrodes is thus substantially parallel to the major (usually planar) surfaces, and thus along the length, of the sheet and not directly through its thickness. A greater range of resistances in devices can thus be produced from a sheet of material that itself has a given resistivity and thickness. Such devices can be made of easily handleable size whilst still having the desired high resistance.

It is one object of the present invention to provide a method of manufacturing an electrical device, for example a circuit protection device, whereby devices of different resistance can be produced conveniently from the same base material, for example PTC material, preferably polymeric, in sheet form.

It is another object of the present invention to provide a method in accordance with the said one object of the invention, whereby devices of handleable size produced from sheet and having significantly higher resistance than those previously known can be produced.

It is a further object of the present invention to provide electrical devices, for example circuit protection devices, preferably made from polymeric PTC sheet material, having higher resistance than known devices.

In accordance with one aspect of the present invention, there is provided a method of manufacturing a plurality of electrical devices, the method comprising:

(a) producing a substantially homogeneous, and preferably planar, sheet of a material having a positive temperature coefficient (PTC) of resistivity;

(b) locating electrically conductive members spaced apart from each other on the PTC material, preferably on at least one major surface of the sheet; and (c) cutting the sheet, in one or in two dimensions, thereby to produce a plurality of electrical devices (which may be substantially planar) each of which has at least two of said conductive members thereon that are spaced apart from each other such that, in use, current flow therebetween is substantially parallel to the major surfaces of the sheet of PTC material.

DETAILED DESCRIPTION OF THE INVENTION

By the term "substantially homogeneous sheet of material" is meant a sheet throughout whose entire volume the composition of the material is substantially homogeneous.

It will be appreciated that in the region of the conductive members through which, in use, current flows, the direction of the current will in general not be parallel to the major surfaces of the sheet, but that elsewhere, i.e. substantially throughout the device overall, the direction of current flow will be substantially parallel to those surfaces. This is in contrast with circuit protection devices made from PTC sheet material heretofore available, in which the direction of current flow is perpendicular to the major surfaces i.e. perpendicular to the electrodes of the devices and through the thickness of the sheet.

It will be also appreciated that although the devices of the invention are formed from a sheet of material, preferably in a planar configuration, the devices themselves either by manufacture or by use need not be planar.

Preferably, the PTC material comprises polymeric material.

Preferably, the sheet is produced by extrusion.

Preferably the electrically conductive members are located on the sheet of PTC material, at suitable locations, before the sheet is cut to produce the plurality of individual electrical devices. However, it is also envisaged that the PTC sheet may be cut into individual portions and the electrically conductive members subsequently appropriately located thereon.

The conductive members may be located on one only or on both of the major surfaces of the PTC material. The cutting of the sheet may result in devices that themselves have conductive members on one or both of their major surfaces. The conductive members may be applied in discrete form to the PTC sheet and may or may not be themselves cut by the cutting step (c). A conductive member may be applied as one or more continuous strips, for example along an edge of the sheet, and may be cut in step (c) so as to provide conductive members, serving as electrodes, for a plurality of devices. Conductive material may be applied as a continuous layer, for example by deposition, or a photo-resist method, to one or both major surfaces of the sheet. Subsequently part of the layer may be removed from the sheet, for example by etching, so as to provide a plurality of conductive members thereon. Preferably, a conductive sheet or foil, for example of 0.025 mm thickness, is hot-pressed on to the PTC material. Alternatively, conductive material may be applied to the sheet of PTC material by a continuous deposition process. This could conveniently involve the use of a mask such that discrete electrodes are deposited. The deposited layer could be a film of thickness about 25 micrometers, which could be built up, into a thicker film if necessary, by successive depositions.

The electrical devices formed from a single sheet by the method of the invention may be generally rectangular or circular, or have any other required shape. The devices are particularly applicable for use in circuit protection devices, the conductive members acting as electrodes.

As set out above, the resultant conductive members of each device are such that, in use, current flow is substantially parallel to the major surfaces of the device, and it is specifically required that substantially no current at all flow transversely thereof (since this would give rise to a lower resistance path that would reduce the effectiveness of the device since the current at which the device would protect an associated circuit would be higher). However, it may be convenient, or indeed desirable, for example for the purpose of making electrical connection to the device, actually to have conductive members on the PTC material on opposite faces thereof. It must then be ensured, however, that the electrical connections are such that substantially no current can flow through the thickness of the PTC material. This may be achieved, for example, by electrically interconnecting (short-circuiting) appropriate conductive members, or just by allowing them to adopt the local electrical potential (float) without making any connection thereto.

Advantageously, for high resistance devices, the thickness of the sheet of PTC material is less than about 2 mm, and may be about 1 mm, and preferably is less than about 0.5 mm, whilst its resistivity is as high as can conveniently and reliably be achieved, typically being up to about 10 ohm-cm.

Particularly, advantageous embodiments of devices produced by the method of the present invention are rectangular in shape, and have a rectangular conductive member extending along each of two opposing edges thereof (i) both on the same surface, or (ii) on opposing surfaces of the sheet of PTC material. Typically, such devices may be of length about 15 mm and width from about 2 mm to 10 mm.

In accordance with another aspect of the present invention, there is provided a circuit protection device comprising a substantially homogeneous sheet that (a) is formed of material having a positive temperature coefficient of resistance, (b) has a thickness less than about 2 mm, (c) has on at least one major surface thereof two electrodes that are spaced apart such that, in use, current flow therebetween is substantially parallel to the major surfaces of the sheet, and (d) has a resistance (along the current flow path between the electrodes) at 20° C. that is greater than 1 ohm.

The electrodes may or may not be on the same major surface of the sheet of PTC material.

Thus, the resistivity of the PTC material, which is preferably polymeric, the thickness of the sheet, and the size and separation of the conductive members are selected such that the devices of the invention have a resistance at room temperature (that is to say at 20° C.) of at least 1 ohm, preferably at least 20 ohms, and typically 100 ohms. Such devices can limit trip current up to about 400 mA.

Advantageously, the resistivity of the PTC material is as high as possible, and in practice is preferably greater than 1 ohm-cm.

Preferably the device of said another aspect of the present invention is produced by the method of said one aspect of the present invention. However, it is envisaged that the electrodes of the device could be applied to the PTC material as discrete components. In this latter respect, for example, a substrate, such as a printed circuit board, may be itself provided with electrodes that are arranged to clamp on to, or otherwise make good electrical contact with, the PTC strip. Thus, the electrodes, although preferably being bonded to the PTC material, may simply be in good physical contact therewith.

Advantageously, the method and device of the present invention are such that the device is provided with means for encouraging the formation of a local hot spot in the PTC material, so that the concentrated heating will more quickly give rise to tripping of the device. The hot spot, which may be linear, that is to say a hot line, should be located away from the electrodes, thus preferably halfway therebetween, so as to avoid any damage thereto. The hot spot can conveniently be encouraged by locally reducing the amount of PTC material present.

In accordance with a still further aspect of the present invention, there is provided an electrical circuit comprising at least one electrical component susceptible to excessive current and/or temperature, and a device arranged to protect the component thereagainst, wherein the protection device comprises a substantially homogeneous sheet of PTC material of thickness less than 2.0 mm, the sheet being mounted in the circuit with two spaced apart electrodes in good electrical contact therewith such that, in use, current flow between the electrodes is substantially parallel to the major surfaces of the PTC sheet and such that the resistance at 20° C. of the PTC material between the electrodes is greater than 1 ohm.

BRIEF DESCRIPTION OF THE DRAWINGS

Methods of manufacturing electrical devices, and electrical devices themselves, in accordance with the present invention, will now be described, by way of example, with reference to the accompanying drawings, in which.

DETAILED DESCRIPTION OF THE DRAWINGS

Figure 1:
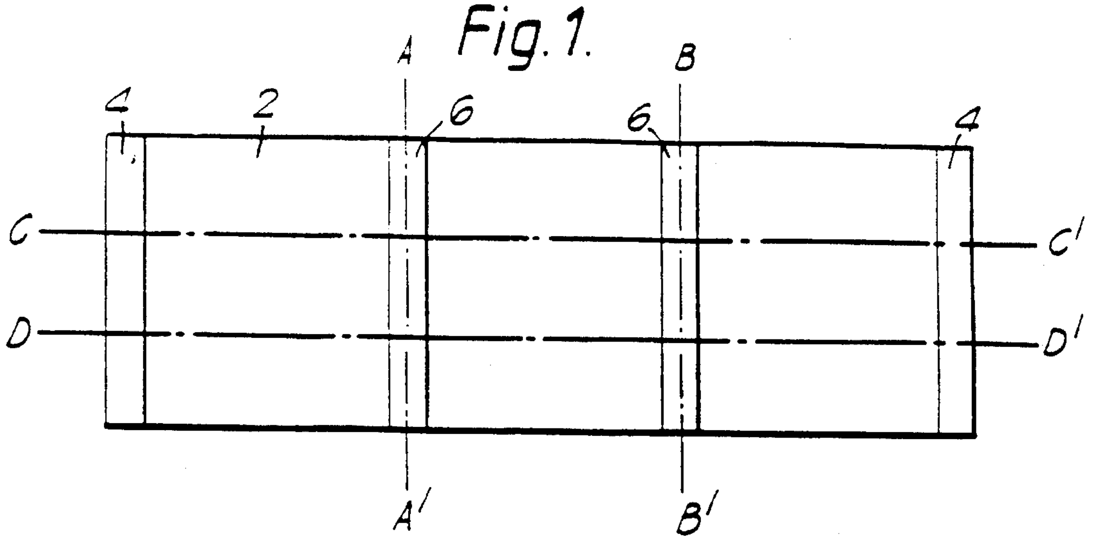
FIGS. 1 shows one embodiment of a PTC sheet with nine identical devices each as shown in FIG. 1A cut therefrom.

FIG. 1 shows a plan view of a rectangular sheet 2 of polymeric PTC material of 0.5 mm thickness having a resistivity of 4 ohm-cm. Conductive material, nickel, of thickness 1 mil (25 micron) is deposited on to one surface only of the sheet so as to provide a relatively narrow strip 4 along each of two opposing edges, and two relatively wide strips 6 equispaced therebetween. By cutting the sheet 2 along the symmetrical lines AA', BB', CC', and DD', nine substantially identical devices are formed, each as shown in FIG. 1A.

Figure 2:
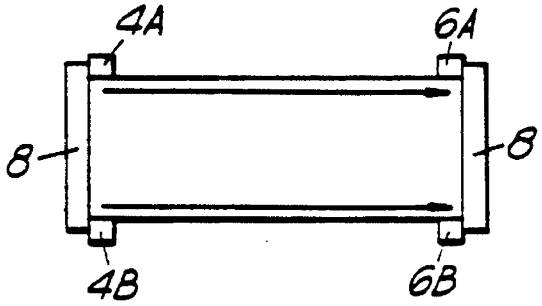
FIG. 2 to 4 show alternative embodiments of devices.

If conductive material has been deposited in strips on both sides of the sheet 2 of FIG. 1, a device as shown in FIG. 2 is produced, the upper conductive members being referenced A and the lower B. To avoid current flow from electrodes A to electrodes B directly (i.e. 4A to 4B, and 6A to 6B) through the thickness of the PTC material 2, pairs of the electrodes can be shorted out as shown by the discrete conductors 8. Alternatively, the pair of B electrodes could be left unconnected. As a further alternative, the pair of electrodes 4A and 6B (or 4B and 6A) could be left unconnected. The latter arrangement is equivalent electrically to the device of FIG. 3.

Figure 3:
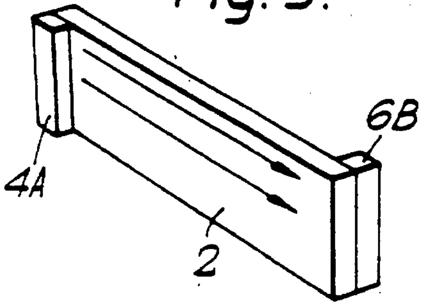

FIG. 3 shows a further embodiment of device, in which the conductive material is deposited in strips on the PTC sheet 2 alternatively on upper and lower major surfaces so that after cutting, the device has one end electrode 4A on an upper surface and an opposing end electrode 6B on a lower surface.

Figure 1A:
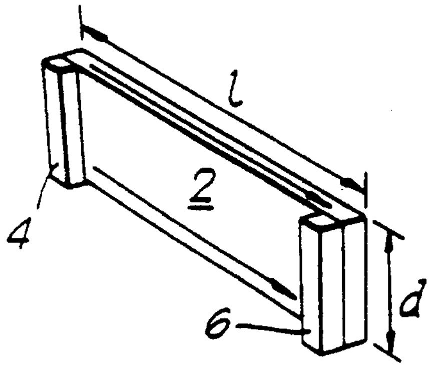

In each of FIGS. 1A, 2 and 3, the direction of current flow through the device, as shown by the arrow, is substantially parallel to the plane of the PTC material. Taking FIG. 1A as an example, the separation 8 mm of the electrodes, and their transverse dimension 4 mm determines the resistance of the device, for a PTC material of given resistivity and formed as a sheet of given thickness. Thus, simply by varying the disposition of the conductive material, for example the length and separation of the strips 4, 6, devices of different resistances can conveniently be produced. For example, a 0.5 mm thick sheet of resistivity 4 ohm-cm with d=4 mm and l=8 mm, will provide a device at room temperature having a resistance of about 80 ohms and a circuit protection current of about 30 mA.

Figure 4:
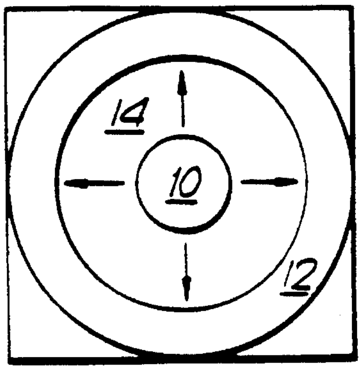

FIG. 4 shows a device of generally circular configuration that has been stamped out of a larger sheet. In this example, a central disc electrode 10 and an outer annular electrode 12 are disposed on and separated by PTC sheet material 14.

Although the invention has been described in respect of producing rectangular or circular configuration devices, each of the same size, from a single sheet of given resistivity and thickness, it will be appreciated that by selecting a different configuration of conductive material, devices having other resistances, and thus other values of circuit protection current, can conveniently be produced from the same sheet.

Using photo-etching, the separation of the electrodes across the surface of the PTC material may be as little as 0.1 mm, but typically the electrode separation would lie in the range from about 0.2 to 1.0 cm. The thickness of the sheet of PTC material would typically be from about 0.25 to 1.0 mm.

Figure 5A:
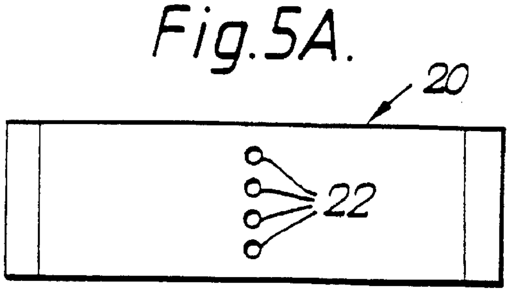
FIGS. 5A, 5B and 5C show three devices having different configurations for enhancing switching performance.
Figure 5B:
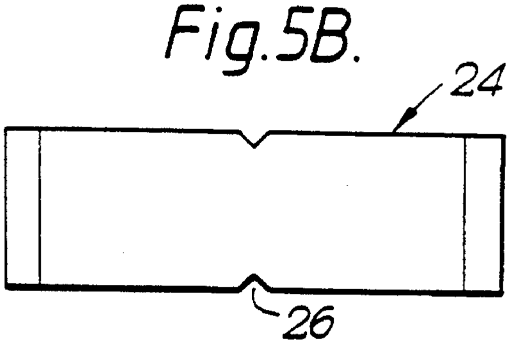
Figure 5C:
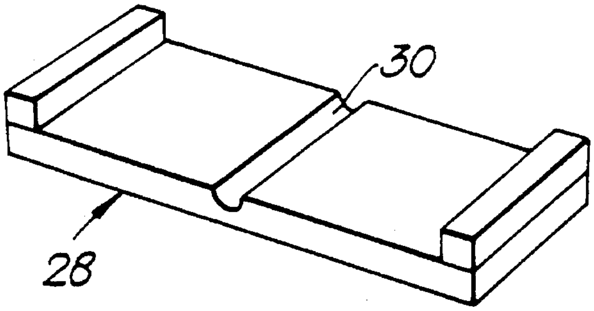

FIGS. 5A (plan view), 5B (plan view) and 5C (perspective view) show respective ways of enhancing the performance of the circuit protection device of FIG. 1A. It will be appreciated that in operating conditions in which the current through, and/or temperature of, the device becomes excessive thus needing it to trip to protect its associated circuit, it is desirable that the tripping, or switching, action takes place as quickly as possible. p This can be enhanced in the case of overcurrent protection if the formation of a local hot spot can be encouraged. Each of these Figures achieves that effect, by providing a region, for formation of a so-called hot line, of reduced PTC material, thereby locally enhancing the current density and reducing the thermal mass preferentially. This region is concentrated away from the electrodes, preferably halfway along the device, thus avoiding damage to the electrodes and also avoiding any heat sink effect they may otherwise create. Thus, the device 20 of FIG. 5A has holes 22 formed therethrough; the device 24 of FIG. 5B has a pair of notches 26 cut in the sides thereof; and the device 28 of FIG. 5C has a channel 30 in one of its major surfaces.

Figure 6:
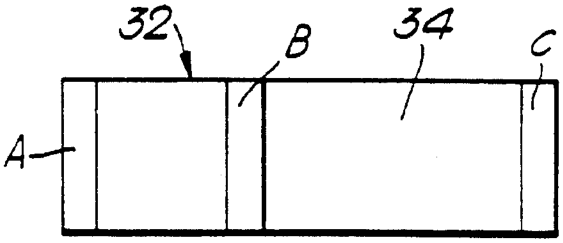
FIG. 6 shows a plan view of a further modification of the device of FIG. 1A.

Referring to FIG. 6, the device 32 comprises a sheet (or strip) 34 of PTC polymeric material of 0.5 mm thickness and resistivity 5 ohm-cm. Three nickel electrodes A, B, C are applied to one surface thereof such that the separation of A and B is 4 mm and of B and C is 8 mm. The device 32 can be arranged to have different current protection values depending on how electrical contact is made between the electrodes A, B, C and the associated electrical circuit. For example, if external conductors are attached only to the electrodes A and B, the resistance between these electrodes, 133 ohms, gives a protection current therebetween of 21 mA. In this configuration, electrode C, and the PTC material lying between electrodes B and C, is superfluous and plays no part in operation of the device. Alternatively, conductors can be attached to electrodes B and C, giving a device with a resistance of 266 ohms and a protection current of 18 mA. In a further arrangement, electrodes A and C can be connected together directly by an external conductor, and conductors taken from electrodes B and C to an external circuit. This effectively results in a device formed from two PTC resistors A-B and B-C connected in parallel, giving a combined resistance of 90 ohms and a protection current value of 40 mA. Clearly, other combinations can be made.

In general, therefore, it is seen that by using a device having three, or more, electrodes thereon, and by selecting the spacing between them, a single device can be used in a variety of applications where different protection currents are required.

The devices may be mounted between clips on a circuit board, when the device of FIG. 2 may be particularly suitable, or terminal conductors may be connected to the conductive members (electrodes) thereof, for ease of connection into an electrical circuit.

It will be appreciated that any one device in accordance with the present invention may have some or all of the features disclosed in all the described embodiments.

What is claimed is:

1. A method of manufacturing a plurality of circuit protection devices, the method comprising:

(a) extruding a substantially homogeneous sheet of a material, said sheet having parallel major surfaces and said material having a positive temperature coefficient (PTC) of resistivity;

(b) locating electrically conductive members spaced apart from each other on the PTC material; and (c) cutting the sheet so as to produce a plurality of substantially planar individual portions which can be formed into circuit protection devices, each of which devices having at least two of said conductive members located on at least one of the major surfaces and spaced apart from each other such that, when the devices are in use, current flow between the two said conductive members is substantially parallel to the major surfaces of the sheet of PTC material.

2. A method according to claim 1, wherein the PTC material comprises a polymeric material.

3. A method according to claim 1, wherein the conductive members are located on only one of the major surfaces of the PTC material before, after, or before and after cutting step (c).

4. A method according to claim 1 wherein the conductive members are located on both major surfaces of the PTC material before, after, or before and after cutting step (c).

5. A method according to claim 1, wherein at least one of the conductive members is located as a continuous strip along the sheet of PTC material.

6. A method according to claim 1, wherein each of the devices has a resistance between said two conductive members of at least 1 ohm at 20° C.

7. A method according to claim 6, wherein each of the devices has a resistance between said two conductive members of at least 10 ohms at 20° C.

8. A method according to claim 1, wherein the conductive members are deposited discretely on to the sheet.

9. A method according to claim 1, wherein step (b) comprises depositing a continuous layer of conductive material onto at least one of the major surfaces of the sheet, and removing part of the layer thereby to produce said spaced apart conductive members.

* * * * *